US008262528B2

(12) United States Patent
Gasch et al.

(10) Patent No.: US 8,262,528 B2

(45) Date of Patent: Sep. 11, 2012

(54) POWER TRANSMISSION DEVICE

(75) Inventors: Christian Gasch, Tochigi (JP); Isao Hirota, Tochigi (JP); Atsushi Tamura, Tochigi (JP); Shouji Yoshida, Tochigi (JP); Susumu Sasaki, Tochigi (JP)

(73) Assignee: GKN Driveline Torque Technology KK, Tochigi-shi, Tochigi-ken (JP)

( * ) Notice: Subject to any disclaimer, the term of this patent is extended or adjusted under 35 U.S.C. 154(b) by 1096 days.

(21) Appl. No.: 12/171,419

(22) Filed: Jul. 11, 2008

(65) Prior Publication Data

US 2009/0017982 A1 Jan. 15, 2009

(30) Foreign Application Priority Data

Jul. 13, 2007 (JP) ................................ P2007-184544

(51) Int. Cl.
*F16H 57/04* (2010.01)

(52) U.S. Cl. ........................................................ 475/160

(58) Field of Classification Search .................. 475/159, 475/160; 74/606 R See application file for complete search history.

(56) References Cited

U.S. PATENT DOCUMENTS

| | | | | |
|---|---|---|---|---|
| 4,468,981 | A * | 9/1984 | Ries | 475/225 |
| 6,398,687 | B2 * | 6/2002 | Iwata | 475/160 |
| 6,510,932 | B2 * | 1/2003 | Ikeda et al. | 192/54.4 |
| 6,579,202 | B2 * | 6/2003 | El-Antably et al. | 475/159 |
| 6,622,838 | B2 * | 9/2003 | Suzuki | 192/35 |
| 7,186,198 | B2 * | 3/2007 | Selva et al. | 475/159 |
| 7,481,735 | B2 * | 1/2009 | Moon | 475/159 |
| 2007/0056824 | A1 | 3/2007 | Ekonen et al. | |

FOREIGN PATENT DOCUMENTS

| | | |
|---|---|---|
| EP | 1 288 519 A1 | 3/2003 |
| JP | 10-292827 | 11/1998 |
| JP | 2001-012507 | 1/2001 |
| JP | 2006-253400 A | 9/2006 |

OTHER PUBLICATIONS

European Search Report mailed Mar. 31, 2009, for EP Application No. 08160005.8, eight pages.

* cited by examiner

*Primary Examiner* — Ha D. Ho

(74) *Attorney, Agent, or Firm* — Morrison & Foerster LLP

(57) ABSTRACT

A power transmission device 1 includes a power transmitting mechanism 15 having a first casing 3, a speed change mechanism 13 and first oil and an intermittent mechanism 27 having a pair of rotating members 17, 19, an intermittent part 21, an actuator 23, a second casing 25 and second oil. The second casing 25 includes a first casing member 33 having a cylindrical part 29 and one end wall 31 and a second casing member 37 having another end wall 35 connected to the cylindrical part 29 integrally. The second casing 25 further includes a sealing member 39 arranged between the rotating member 19 and the end wall 31, another sealing member 41 arranged between the rotating member 19 and the other end wall 35 and an O ring arranged between the first casing 33 and the second casing 37, respectively. The second oil is enclosed in the second casing 25.

8 Claims, 7 Drawing Sheets

107
203
43
207
51
41
57
208
205
206
85
209
25
83
21
18
17
27
29
201
91
89
101
87
23
22
47
45
19
99
93
97
81
100
33
49
39
77
79
31

38
43
37
41
57
35
85
309
25
83
21
18
17
27
29
301
303
307
305
99
93
33
18
91
89
97
101
81
87
23
49
31
39
77
79

601
3
43
607
35
7
53
59
41
55
609
57
47
45
19
99
93
97
81
605
79
25
83
21
17
27
29
91
89
101
87
23
603
31
39
77

801
803
805
807
809
811
813
815
57
85
309
25
83
21
18
17
27
29
303
307
305
99
93
18
91
89
97
101
81
87
23
49
39
77
79
31
33

POWER TRANSMISSION DEVICE

BACKGROUND OF THE INVENTION

1. Field of the Invention

The present invention relates to a power transmission device for a vehicle.

2. Description of the Related Art

Japanese Patent Laid-open Publication No. H10-292827 (hereinafter referred to as "Patent Document No. 1") discloses a driving force transmission device. The driving force transmission device includes a coupling unit as an example of an intermittent mechanism that is connected to a drive pinion shaft extending from a differential carrier accommodating a differential device as a power transmission mechanism. The coupling unit is arranged in an inside space of a cover fixed to one end of the differential carrier. The coupling unit is sealed up with oil by a coupling case, a shaft, an X ring and an O ring. The inside space of the cover is segmentalized into a fluid space (in detail, an air chamber) by a seal bearing, an oil seal and so on. The space in the differential carrier is enclosed with other oil lubricating the differential device through an oil seal etc.

Japanese Patent Laid-open Publication No. 2001-12507 (hereinafter referred to as "Patent Document No. 2") discloses a coupling unit. This coupling unit is arranged in a front cover fixed to one end of a differential carrier, similar to the Patent Document No. 1. The front cover is enclosed, therein, with oil through oil seals. This oil different from the oil on the side of a rear differential as one example of the power transmitting mechanism flows and lubricates the inside of the coupling unit through an oil passage formed in a rotary case of the coupling unit

SUMMARY OF THE INVENTION

In the Patent Document No. 1, as lubricating oil is enclosed in a coupling case of the coupling unit, it is impossible to ensure adequate amounts of oil. Thus, the oil is apt to be elevated in temperature and deteriorated in quality since it is subjected to transmission of torque by a frictional clutch.

On the contrary, the mechanism disclosed in the Patent Document No. 2 suppresses such temperature rise and quality deterioration of oil because the oil enclosed in the front cover is distributed to the interior of the coupling unit.

However, the intermittent mechanism of the Patent Document No. 2 has a problem in its segmentalization against the differential carrier. That is, although the front cover is enclosed with oil different from that in the carrier body with the aid of the oil seals, if detaching the front cover from the carrier body in assembling or disassembling the coupling unit, then the oil enclosed in the front cover leaks out undesirably. While, if disassembling the oil seals from the front cover, the oil enclosed in the carrier body also leaks out undesirably. In other words, as the mechanism of the Patent Document No. 2 is constructed so that the assembling/disassembling operations of the rear differential and the coupling unit are interrelated with each other, it is impossible for a worker to confirm respective operations of the coupling unit and the rear differential independently of each other. Additionally, even when the rear differential and the coupling unit have malfunctions in operation, it is also impossible to change them with new ones independently of each other, causing the number of man-hour in assembling or disassembling them to be increased remarkably.

Under a situation mentioned above, an object of the present invention is to provide a power transmission device that facilitates worker's assembling/disassembling operations of an intermittent mechanism to and from a power transmitting mechanism while allowing the operation of the intermittent mechanism to be confirmed under condition that the mechanism is being installed actually.

According to the present invention, there is provided a power transmission device for a vehicle, comprising: a power transmitting mechanism having a first casing, a speed change mechanism having a speed change gear assembly supported in the first casing and provided on to at least one pair of power transmitting shafts and first oil accommodated in the first casing to lubricate the speed change mechanism; and an intermittent mechanism having a pair of rotating members, an intermittent part arranged between the rotating members to transmit and interrupt a driving force, an actuator for operating the intermittent part, a second casing accommodating the rotating members and the intermittent part and also connected to the first casing and second oil accommodated in the second casing to lubricate the intermittent part, wherein the second casing includes a first casing member having a cylindrical part and one end wall and a second casing member having another end wall connected to the cylindrical part integrally, the second casing further includes first sealing means arranged between other of the rotating members and the end wall, between the other of the rotating members and the other end wall and also between the first casing and the second casing, respectively, and the second oil is enclosed in the second casing.

DETAILED DESCRIPTION OF THE PREFERRED EMBODIMENT

First of all, a power system on application of a power transmitting device of embodiments will be described with reference to FIG. 1. Although the illustrated power system is provided with a power transmission device 1 of the first embodiment, much the same is true on power systems to which power transmitting devices of the other are applied.

Figure 1:
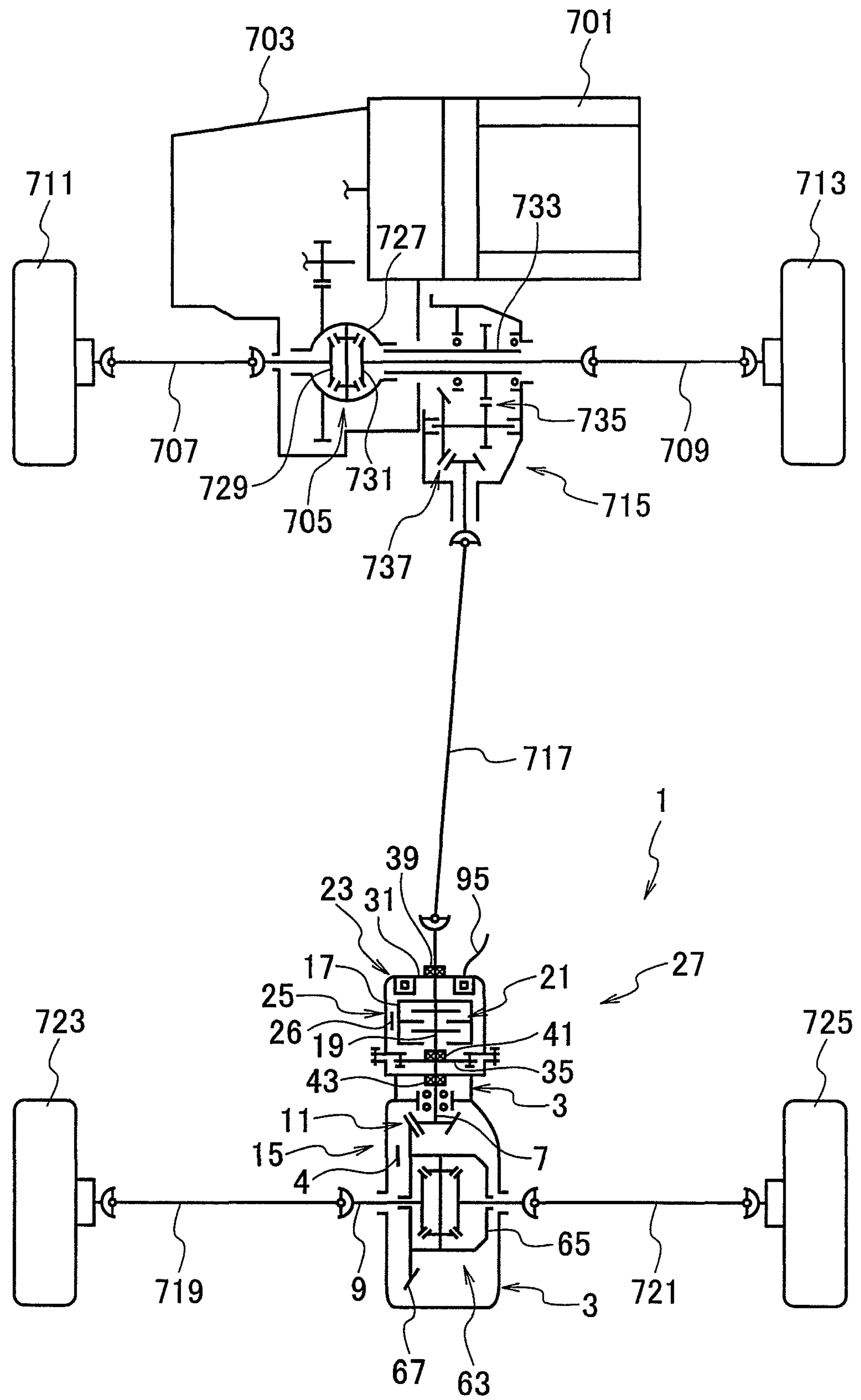
FIG. 1 is a schematic view showing a power system of a vehicle.

As shown in FIG. 1, the power system of a vehicle comprises an engine 701 as a power source (e.g. motor), a transmission 703 as a gearshift mechanism, a front differential 705, front axles 711, 713, a transfer 715, a propeller shaft 717 on rear wheels' side, the power transmission device 1 having an intermittent mechanism (clutch) 27 and a power transmitting mechanism 15, a rear differential 63, rear axles 719, 721, rear wheels 723, 725 and so on.

The driving force of the engine 701 is transmitted from the transmission 703 to the front differential 705 through the differential casing 727. Then, through the side gears 729, 731 in pairs, the driving force is successively distributed from the front axles 707, 709 to the front wheels 711, 713. The driving force transmitted to the differential casing 727 is transmitted from a hollow shaft 733 to the propeller shaft 717 through a speed change gear assembly 735 and a conversion gear assembly 737. In succession, the so-transmitted driving force is transmitted to the rear differential 63 through the intermittent mechanism 27 and the power transmitting mechanism 15 of the power transmission device 1 and subsequently distributed from the rear axles 719, 721 to the rear wheels 723, 725.

The above mechanism on the front wheel's side is connected to and disconnected from the mechanism on the rear wheel's side by the intermittent mechanism 27 of the power transmission device 1. When the intermittent mechanism 27 is operated in connection, the vehicle is brought into a four-wheel driving condition in the front/rear drive. While, when the connection of the intermittent mechanism is released, the vehicle is brought into a two-wheel driving condition in the front drive. Hereinafter, the power transmission device 1 will be described.

$1^{st}$. Embodiment

Figure 2:
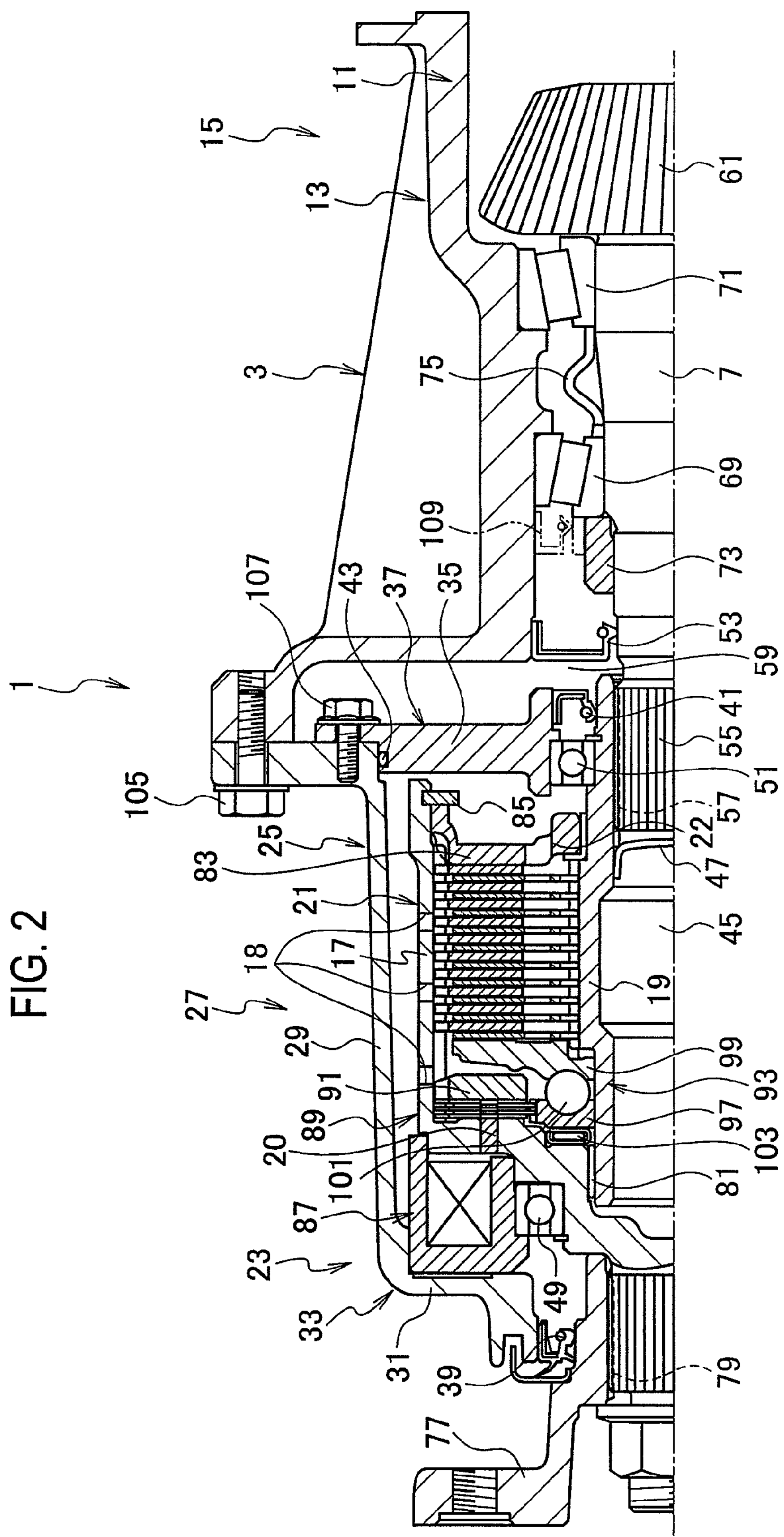
FIG. 2 is an enlarged sectional view of a substantial part of a power transmission device in accordance with a first embodiment of the present invention.

Referring to FIG. 2, we now explain the power transmission device 1 in accordance with a first embodiment of the present invention.

The power transmission device 1 of the embodiment comprises the power transmitting mechanism 15 and the intermittent mechanism 27 mainly. The power transmitting mechanism 15 includes a first casing 3, a speed change mechanism 13 having a speed change gear assembly 11 supported in the first casing 3 and fixed to at least one pair of power transmitting shafts 7, 9 and first oil 4 accommodated in the first casing 3 to lubricate the speed change mechanism 13. The intermittent mechanism 27 includes a pair of rotating members 17, 19, an intermittent part 21 arranged between the rotating members 17, 19 to transmit and interrupt the driving force, an actuator 23 for operating the intermittent part 21, a second casing 25 accommodating the rotating members 17, 19 and the intermittent part 21 and also connected to the first casing 3 and second oil 26 accommodated in the second casing 25 to lubricate the intermittent part 21. The second casing 25 includes a first casing member 33 having a cylindrical part 29 and one end wall 31 and a second casing member 37 having another end wall 35 connected to the cylindrical part 29 integrally. Additionally, the power transmission device 1 includes first sealing members 39, 41, 43 arranged between the rotating member 17 and the end wall 31, between the rotating member 19 and the end wall 35 and between the first casing 33 and the second casing 37, respectively. The second oil 26 is enclosed in the second casing 25.

The rotating member 17 is formed by an outer rotating member in the form of a cylinder, while the rotating member 19 is formed by an inner rotating member in the form of a shaft. The rotating member 19 is provided, on its core side, with a hollow part 45. In order to enclose the oil in the second casing 25, a dished plug 47 as a second sealing member is provided independently of the inner rotating member 19 and also press-fitted in the hollow part 45.

The first casing member 33 supports the outer rotating member 17 through a bearing 49, while the second casing member 37 supports the inner rotating member 19 through a bearing 51. Between the first casing member 33 and the bearing 49, there is also interposed an electromagnet 87 as a component of a later-mentioned actuator 23, which is secured to the first casing member 33 through fixing means, such as bolts. Thus, the first casing member 33 supports the outer rotating member 33 substantially.

The second casing member 37 is connected, on its outer circumferential side, with the first casing member 33 integrally. Also, the second casing member 37 has the first sealing member 41 fixed on the inner circumferential side to slidably contact with the outer circumferential surface of the inner rotating member 19.

Additionally, the power transmitting mechanism 15 has a shaft member 7 supported by the first casing 3 to have one end projecting therefrom in the axial direction and a third sealing member 53 arranged between the first casing 3 and the shaft member 7 to enclose the first oil 4 in the first casing 3. The shaft member 7 is connected to either the rotating member 17 or the rotating member 19 so as to allow its rotation in integral therewith.

The shaft member 7 is formed, on one end, with a spline part 55 for engagement with a spline hole 57 formed on the core side of the inner rotating member 19. The spline part 55 is lubricated by a third oil separated from the first oil 4 and the second oil 26 through the sealing members 41, 43 and the third sealing member 53.

The third oil is composed of grease applied on the spline part 55. In a segmentalized space 59, there are grease and air in mixture.

As shown in FIG. 2, the power transmitting mechanism 15 includes the first casing 3, the speed change mechanism 13 and the first oil 4. The first casing 3 comprises a plurality of casing members in separation and accommodates the speed change gear assembly 11 of the speed change mechanism 13.

The speed change gear assembly 11 comprises a drive pinion gear 61 formed integrally with the shaft member 7 and a ring gear 67 which is not formed integrally with the differential casing 65 of the rear differential 63 (FIG. 1) but fixed to the casing 65 thereafter. The shaft member 7 is supported by the first casing 3 through bearings 69, 71. Again, the shaft member 7 has one end projecting from the first casing 3 in the axial direction. The bearing 69 is secured on the shaft member 7 by a nut 73 fitted on the outer circumference of the shaft member 7. A spacer 75 is interposed between the bearing 69 and the bearing 71. In the above-constructed power transmitting mechanism 15, respective sliding members are lubricated by the first oil 4 enclosed in the first casing 3. When the intermittent mechanism 27 is activated foe connection, the driving force is transmitted to the speed change gear assembly 11 and the side of the rear differential 63.

As mentioned before, the intermittent mechanism 27 includes the outer rotating member 17 in the form of a cylinder, the inner rotating member 19 in the form of a shaft, the intermittent part 21, the actuator 23, the second casing 25 and the second oil 26.

The outer rotating member 17 is spline-connected to a joint member 77 connected to the propeller shaft 717 (FIG. 1) through a spline part 79. Again, the outer rotating member 17 is supported by the first casing member 33 of the second casing 25 through the bearing 49. The inner rotating member 19 is shaped so as to be a shaft having with the hollow part 45. In the hollow part 45, the spline hole 57 is fitted to the spline part 55 of the shaft 7. The inner rotating member 19 is supported by the outer rotating member 17 through the bearing

81 and also supported by the second casing member 37 of the second casing 25 through the bearing 51.

The intermittent part 21 comprises a plurality of clutch plates connected with both the inner circumference of the outer rotating member 17 and the outer circumference of the inner rotating member 19. On the clutch plates' side close to the first casing 3, there is a receiving member 83 to make resistance to the axial movement of the clutch plates. A snap ring 85 is arranged so as to abut on an outer circumferential end of the receiving member 83. The snap ring 85 is also fitted to the inner circumference of the outer rotating member 17, accomplishing the fixing of the receiving member 83 in the axial direction on one side. The so-constructed intermittent part 21 is operated by the actuator 23. When the intermittent part 21 is activated for connection, the outer rotating member 17 is connected to the inner rotating member 19, that is, the transmission mechanism on the front wheels' side of the vehicle is associated with the transmission mechanism on the rear wheels' side, so that the driving force of the engine 701 is transmitted to the rear wheel's side.

The actuator 23 comprises an electromagnet 87, a pilot clutch 89, an armature 91 and a cam mechanism 93. The electromagnet 87 is accommodated in the second casing 25 to support the outer rotating member 17 through the bearing 49. A lead wire 95 (FIG. 1) of the electromagnet 87 is drawn out of the second casing 25 and connected to a not-shown controller for the actuator 23.

The pilot clutch 89 is formed by a plurality of clutch plates connected to the inner circumference of the outer rotating member 17 and the outer circumference of the cam ring 97. The armature 91 is connected to the inner circumference of the outer rotating member 17. In operation, the armature 91 is axially moved to the rotating member 17 to fasten the pilot clutch 89 since magnetic lines generated from the activated electromagnet 87 are transmitted through the same member 17, the pilot clutch 89 and the armature 91. When the pilot clutch 89 is activated for its fastening, a cam thrust force is generated in the cam mechanism 93.

The cam mechanism 93 comprises a cam ring 97, a pressure plate 99 and a cam ball 101. The cam ring 97 is supported on the outer circumference of the inner rotating member 19. A bearing 103 is arranged between the cam ring 97 and the outer rotating member 17 to receive the cam thrust force. The pressure plate 99 is also supported on the outer circumference of the inner rotating member 19. The cam ball 101 is arranged between the cam ring 97 and the pressure plate 99. In the cam mechanism 93, when the pilot clutch 89 is activated for its fastening, there is produced, between the cam ring 97 and the pressure plate 99, a differential rotation to produce the cam thrust force. Consequently, due to the cam thrust force, the pressure plate 99 is moved in the axial direction to cause the intermittent part 21 to be fastened. The so-formed intermittent mechanism 27 is accommodated in the second casing 25.

The second casing 25 is formed by the first casing member 33 and the second casing member 37. The first casing member 33 includes the cylindrical part 29 and the end wall 31. The cylindrical part 29 accommodates the intermittent mechanism 27. In the cylindrical part 29, the electromagnet 87 is arranged on the side of the end wall 31. The lead wire 95 is drawn out of the cylindrical part 29. The first casing member 37 is fixed, on the side of the other end wall, to the first casing 3 through bolts 105. The second casing member 37 has the other end wall 35 connected to a leading surface of the cylindrical part 29 integrally. The outer circumferential part of the end wall 35 is fixed to the first casing member 33 by bolts 107. The second casing member 37 has a cylindrical surface formed in succession to its fixing part for the bolts 107. An annular groove is formed on the cylindrical surface of the member 37 to receive an O ring. Through the O ring, the second casing member 37 is fitted to the cylindrical surface of the first casing member 33 in a sealing manner. In the intermittent mechanism 27, various sliding members are lubricated by the second oil 26 in the second casing 25.

In the power transmission device 1, the first casing 3 and the second casing 25 are segmentalized from each other by respective sealing means.

As the first sealing means, the sealing member 39 is arranged between the outer rotating member 17 and one end wall 31 of the first casing member 33, while the sealing member 41 is arranged between the inner rotating member 19 and the inner circumference of the other end wall 35 of the second casing member 37. Additionally, the O ring 43 is arranged between the first casing member 33 and the second casing member 37. By the first sealing means consisting of the sealing members 39, 41 and the O ring 43, the second oil 26 is enclosed in the second casing 25. As second sealing means, a dish type plug 47 is arranged in the hollow part 45 of the inner rotating member 19. By the plug 47 as the second sealing means, the second oil 26 is enclosed in the second casing 25.

As third sealing means, a sealing member 54 is arranged between the first casing 3 and the shaft member 7 to shut off the first oil 4 enclosed in the first casing 3 from the outside. Grease as a third oil is applied on the spline hole 57 of the inner rotating member 19 and the spline part 55 of the shaft member 7. The spline part 55 is arranged in a space 59 interrupted from the first oil 4 and the second oil 26 by the first casing 3, the second casing 25, a part of the first sealing member 41 (the first sealing means) and the third sealing member 53 (the third sealing means). The space 59 contains grease and air in mixture. In connection, the nut 73 for engagement with the shaft member 7 may be provided with an outer circumferential surface on which a third sealing member 109 (as the third sealing means) is fitted between the first casing 3 and the nut 73.

In the power transmission device 1 constructed above, the second casing 25 accommodating the intermittent mechanism 27 comprises the first casing member 33 and the second casing member 37 that includes the first sealing means 39, 41, 43 to enclose the second oil 26 in the second casing 25. Therefore, there is no possibility that the second oil 26 leaks out of the second casing 25 even if assembling/disassembling the second casing 25 to and from the first casing 3 accommodating the power transmitting mechanism 14 together with the first oil 4.

Thus, it becomes possible to facilitate the assembling/disassembling operation of the intermittent mechanism 27 connected to the power transmitting mechanism 15 and also possible to confirm the operation of the intermittent mechanism 27 in an actually-installed manner.

Additionally, as the hollow part 45 of the inner rotating member 19 serves as a retainer space for the second oil 26, it is possible to maintain an amount of oil suitable to lubricate the intermittent mechanism 27 while reducing the amount of oil enclosed in the second casing 25. During rotating of the intermittent mechanism 27, the oil in the hollow part 45 flows against the intermittent mechanism 27 and further flows into the second casing 25 through openings 18, 20 formed in the outer rotating member 17. Conversely, it is also possible to supply the intermittent mechanism 27 with the second oil 26 through the intermediary of the openings 18, 20, 22. Thus, the intermittent mechanism 27 can be lubricated and cooled down with sufficient amount of oil.

Further, owing to the provision of the first sealing means (39, 41, 43), it is possible to enclose the oil in the second casing 25 and also restrain the eccentric motion of the sliding parts of the first sealing means (39, 41) with the arrangement where the intermittent mechanism 27 is supported by the bearings 49, 51 certainly. It is also possible to enhance the durability of the intermittent mechanism 27 with its improved sealing function.

Also, since respective joint portions (only one shown in the figure) of the second casing member 37 to the first casing member 33 are positioned on the outer circumferential side of the member 37, it is possible to reduce a joint strength (fitting force) of the joint portions per unit area, allowing the connecting structure using the bolts 107 to be small-sized. Further, since the fixing part for the sealing member 41 (the first sealing means) is arranged on the inner circumferential side of the intermittent mechanism 37, the sliding radius of the sealing member 41 is reduced to restrain the circumferential speed of the member 41, it is possible to improve the durability. Without being limited to only the bolts 107, the joint structure between the first casing member 33 and the second casing member 37 may be provided by other joint means, such as adhering, press-fitting, welding and double-nuts. In common with these means, nevertheless, it would be possible to reduce the joint strength due to the illustrated arrangement on the outer circumferential side.

As mentioned above, the power transmission device 1 is constructed so as to have the power transmitting mechanism 15 lubricated by the first oil 4 in the first casing 3 and the intermittent mechanism 27 lubricated by the second oil 26 in the second casing 25. Thus, with the arrangement where the respective mechanisms 15, 27 are arranged in the casings 3, 25 respectively, it becomes possible to facilitate the assembling/disassembling operation and also confirm the operations of the mechanisms in an actually-installed manner. Further, even if the power transmission device 1 has a malfunction, it is possible to replace respective functional units independently of each other, improving the maintenance of the device 1.

As the spline part 55 is lubricated by grease as the third oil different from the first oil 4 and the second oil 26, exclusive and small amount of oil can be used to the essential part of the device 1.

As for the third oil, any type of oil would do so long as it had a function of restraining abrasion of the spline part, for example, mechanical oil flowable at room temperature, grease solid at room temperature and so on.

Additionally, as the segmentalized space 59 is filled up with grease and air, there would not raise a problem even if the grease is mixed with the first oil 4 and the second oil 26. Therefore, it is possible to save the manufacturing cost by adopting inexpensive oil seals for preventing leakage of the first oil 4 and the second oil 26 as the part of the first sealing means (41) and the third sealing means (53). Again, even if the first oil 4 and the second oil 26 leak out, it is possible to prevent the first oil 4 and the second oil 26 from being mixed with each other instantly.

2nd. Embodiment

Figure 3:
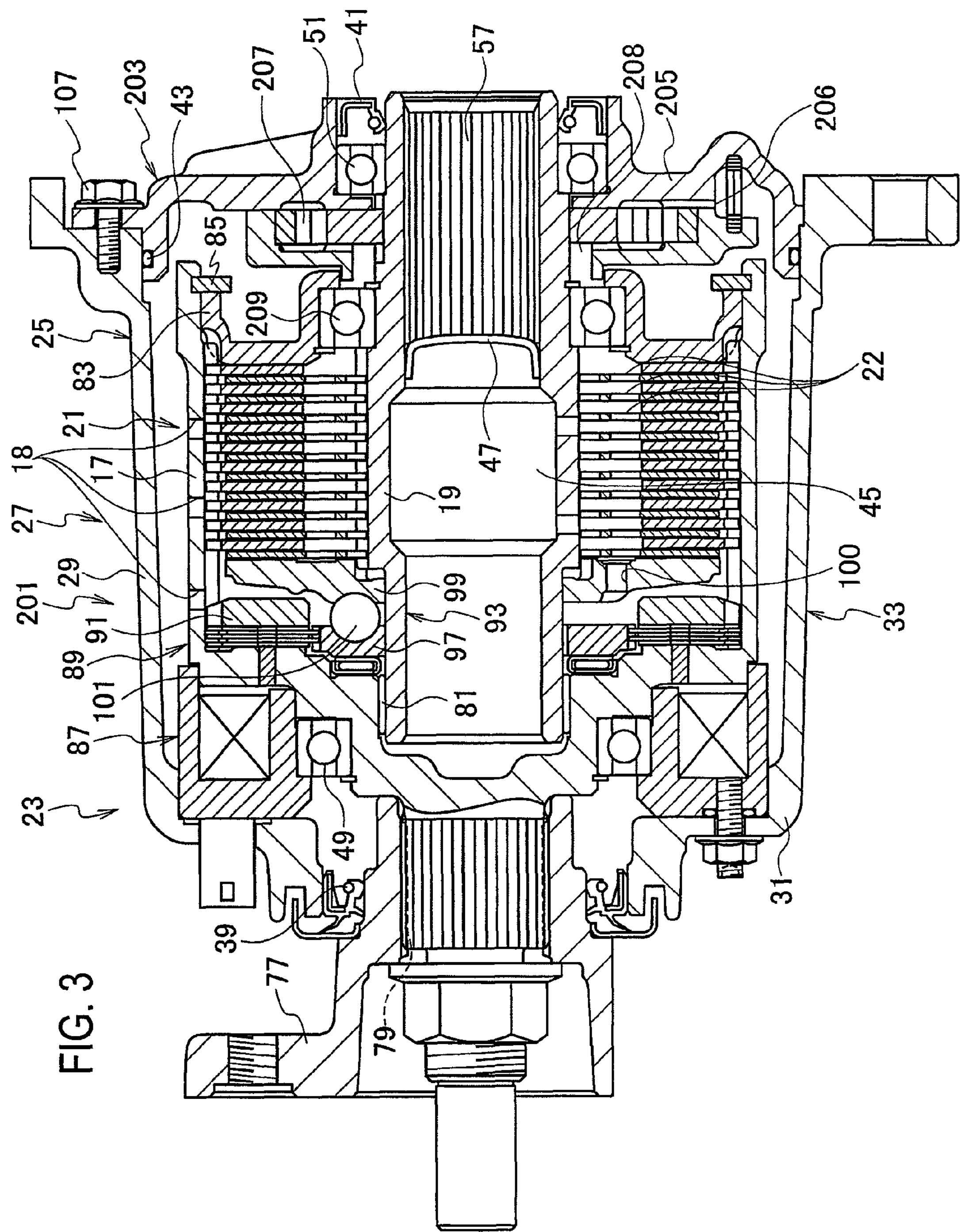
FIG. 3 is an enlarged sectional view of the substantial part of the power transmission device in accordance with a second embodiment of the present invention.

The second embodiment will be described with reference to FIG. 3.

According to the second embodiment, a power transmission device 201 is provided with an oil pump 207. The oil pump 207 is arranged on an end wall 205 of a second casing member 203 to supply the second oil 26 enclosed in the second casing 25 into the intermittent mechanism 27 forcibly. Note, elements identical to those of the first embodiment will be indicated with the same reference numerals respectively and therefore, their overlapping descriptions are eliminated in view of the same effects.

This oil pump 207 is attached to the end wall 205 by not-shown bolts, allowing the oil pump 207 to be handled integrally with the second casing member 203. The oil pump 207 in the form of a rotor has an inner circumferential part engaged with a notch formed in the outer circumference of the inner rotating member 19, allowing the oil pump 207 to rotate integrally with the inner rotating member 19. In lubrication, the second oil 26 enclosed in the second casing member 203 is sucked into the oil pump 207 through an intake port 206 and successively supplied from a discharge opening 208 to the intermittent part 21 and the pilot clutch 89 via a clearance about a bearing 209, respective openings 22 formed in the inner plates of the intermittent part 21 and an opening 100 formed in the pressure plate 99. Then, after lubricating respective frictional sliding parts of both the intermittent part 21 and the pilot clutch 89, the second oil 26 is again discharged into the space in the second casing 25 via openings 18 formed in the outer rotating member 17. Thereafter, the so-discharged second oil 26 is introduced into the intake port 206 again. In this way, a lubrication route for the second oil 26 is established in the second casing 25. In the so-constructed power transmission device 201, on the inner circumferential side of the receiving member 83, the above bearing 209 supports the inner rotating member 19 stably.

In the above-constructed power transmission device 201, the second casing 25 accommodating the intermittent mechanism 27 comprises the first casing member 33 and the second casing member 203 that includes the first sealing means 39, 41, 43 to enclose the second oil 26 in the second casing 25. Therefore, there is no possibility that the second oil 26 leaks out of the second casing 25 even if assembling/disassembling the second casing 25 to and from the first casing accommodating the power transmitting mechanism 14 together with the first oil 4.

Thus, it becomes possible to facilitate the assembling/disassembling operation of the intermittent mechanism 27 connected to the power transmitting mechanism and also confirm the operations of the mechanism 27 in an actually-installed manner.

Additionally, it is possible to facilitate the assembling operation of the device 1 by providing the end wall 205 with the oil pump 207.

3rd. Embodiment

Figure 4:
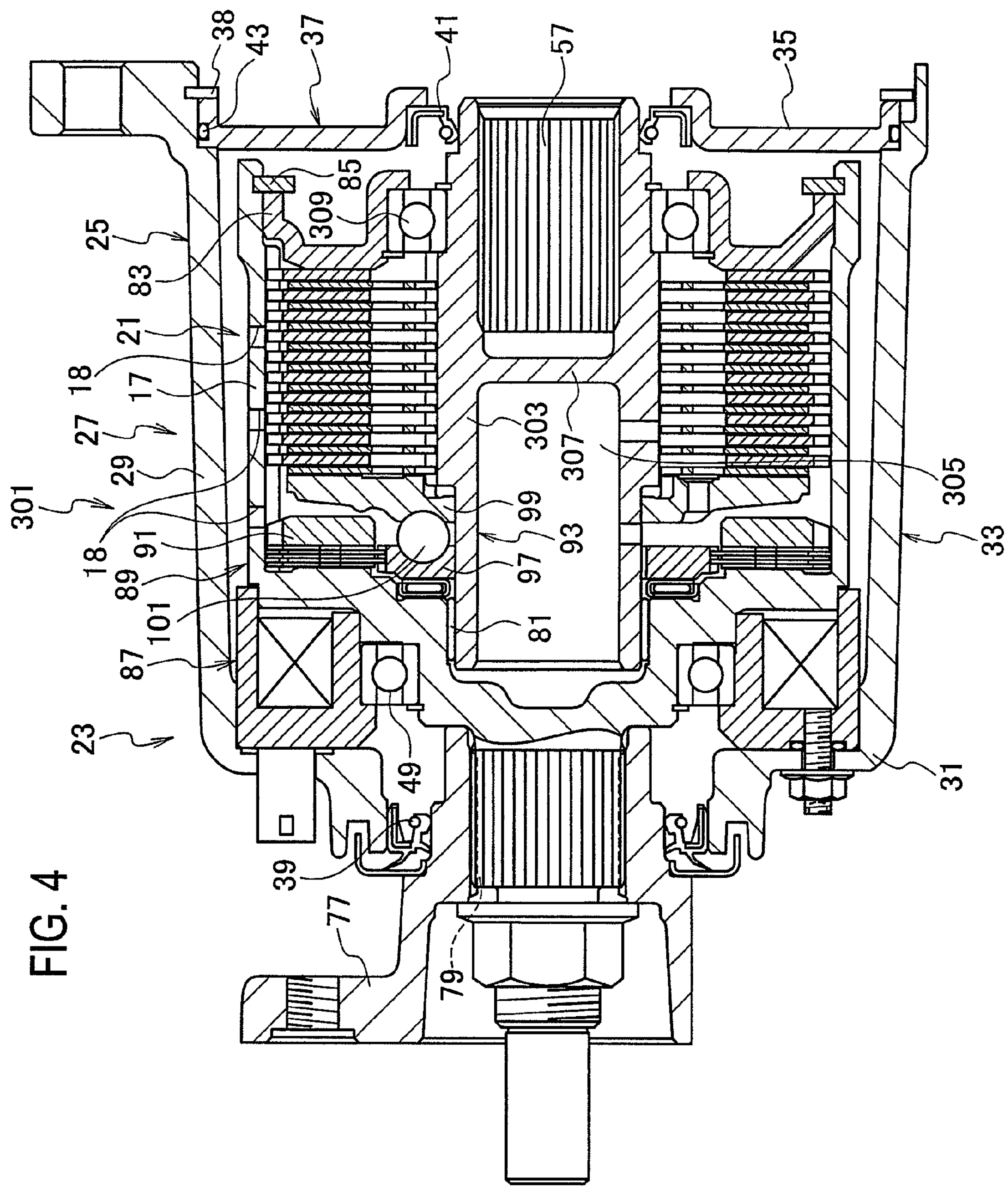
FIG. 4 is an enlarged sectional view of the substantial part of the power transmission device in accordance with a third embodiment of the present invention.

The third embodiment of the present invention will be described with reference to FIG. 4.

A power transmission device 301 of the embodiment includes a partition wall 307 as the second sealing means, which is arranged in a hollow part 305 of an inner rotation member 303 in the form of a shaft to enclose oil in the second casing 25. In this embodiment, elements identical to those of the first embodiment will be indicated with the same reference numerals respectively and therefore, their overlapping descriptions are eliminated in view of the same effects.

In this way, by forming the partition wall 307 in integral with the inner rotating member 303, it is possible to provide the power transmission device 301 having the similar effects to the afore-mentioned embodiments without increasing the number of components. The inner rotating member 303 is supported by the first casing member 33 through the receiving member 83 and a bearing 309.

In the power transmission device 301, the second casing 25 accommodating the intermittent mechanism 27 comprises the first casing member 33 and the second casing member 37 that includes the first sealing means 39, 41, 43 to enclose the second oil 26 in the second casing 25. Therefore, there is no possibility that the second oil 26 leaks out of the second casing 25 even if assembling/disassembling the second casing 25 to and from the first casing (not shown) accommodating the power transmitting mechanism together with the first oil.

Thus, it becomes possible to facilitate the assembling/disassembling operation of the intermittent mechanism 27 connected to the power transmitting mechanism and also confirm the operations of the mechanism 27 in an actually-installed manner. Additionally, the second casing member 37 can be held in a stably-assembled position since it is pinched between a step part of the first casing member 33 and a snap ring 38 while the outer circumferential surface of the member 37 abuts on the inner circumferential surface of the member 33.

Additionally, as the hollow part 305 of the inner rotating member 303 serves as a retainer space for the second oil 26, it is possible to maintain an amount of oil suitable to lubricate the intermittent mechanism 27 while reducing the amount of oil enclosed in the second casing 25. During rotating of the intermittent mechanism 27, the oil in the hollow part 305 is discharged to the outer circumferential side of the outer rotating member 17 to cool down it with sufficient amount of oil.

Still further, it is possible to reduce the number of components forming the device 301 owing to the provision of the hollow part 305 with the partition wall 307.

4$^{th}$. Embodiment

The fourth embodiment of the present invention will be described with reference to FIG. 5.

In a power transmission device 401 of this embodiment, a second casing 403 comprises a first casing member 409 having a cylindrical part 405 and one end wall 407 and a second casing member 413 having an end wall 411 connected to the cylindrical part 405. The power transmission device 401 further includes, as the first sealing means, a sealing member 417 arranged between the outer rotating member 17 and the end wall 411 and another sealing member 415 arranged between the inner rotating member 19 and the end wall 407. The second oil 26 is enclosed in the second casing 403. Also, elements identical to those of the first embodiment will be indicated with the same reference numerals respectively and therefore, their overlapping descriptions are eliminated in view of the same effects.

Figure 5:
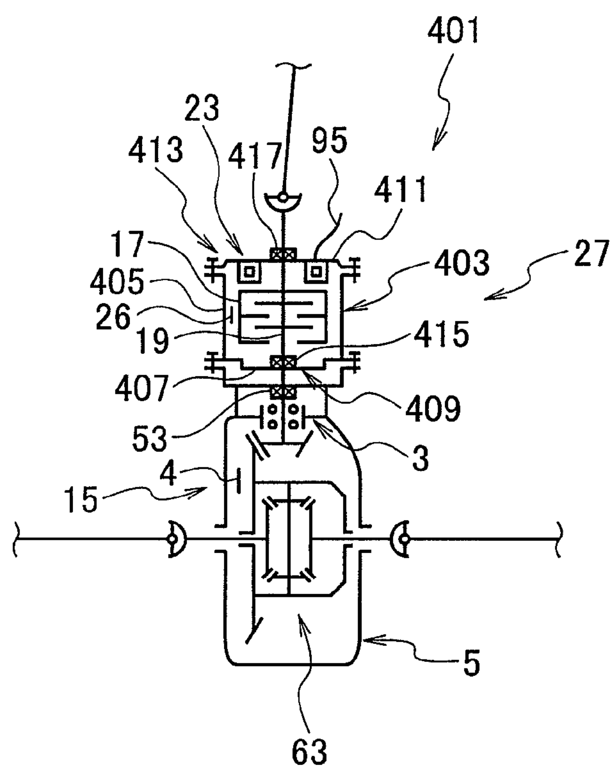
FIG. 5 is a schematic view of the power transmission device in accordance with a fourth embodiment of the present invention.

As shown in FIG. 5, the first casing member 409 has a cylindrical part 405 and one end wall 407. The intermittent mechanism 27 is accommodated in the cylindrical part 405 and fixed, on the side of the end wall 407, to the first casing 3. The second casing member 413 has the end wall 411 connected to the cylindrical part 405 integrally. The end wall 411 is also fixed to the first casing member 409. The actuator 23 is arranged on the side of the end wall 411, while the lead wire 95 is drawn out of the actuator 23. Further, as mentioned above, the first sealing means (417, 415) are arranged between the outer rotating member 17 and the end wall 411 and between the inner rotating member 19 and the end wall 407, respectively. The sliding members in the intermittent mechanism 27 are lubricated by the second oil 26 in the second casing 403.

In the power transmission device 401 constructed above, the second casing 25 accommodating the intermittent mechanism 27 comprises the first casing member 409 and the second casing member 413 that includes the first sealing means 415, 417 to enclose the second oil 26 in the second casing 403. Therefore, there is no possibility that the second oil 26 leaks out of the second casing 403 even if assembling/disassembling the second casing 403 to and from the first casing 3 accommodating the power transmitting mechanism 15 together with the first oil 4.

Thus, it becomes possible to facilitate the assembling/disassembling operation of the intermittent mechanism 27 connected to the power transmitting mechanism 15 and also confirm the operations of the mechanism 27 in an actually-installed manner.

Additionally, with the arrangement where the actuator 23 is attached to the end wall 411, it is possible to facilitate the assembling operation of the actuator 23.

5$^{th}$. Embodiment

The fifth embodiment of the present invention will be described with reference to FIG. 6.

In a power transmission device 501 of this embodiment, a second casing 503 comprises a first casing member 509 having a cylindrical part 505 and one end wall 507 and a second casing member 513 having an end wall 511 connected to the cylindrical part 505 integrally. The power transmission device 501 further includes, as the first sealing means, a sealing member 517 arranged between the outer rotating member 17 and the end wall 507 and another sealing member 515 arranged between the inner rotating member 19 and the end wall 511. The second oil 26 is enclosed in the second casing 503. Also, elements identical to those of the first embodiment will be indicated with the same reference numerals respectively and therefore, their overlapping descriptions are eliminated in view of the same effects.

Figure 6:
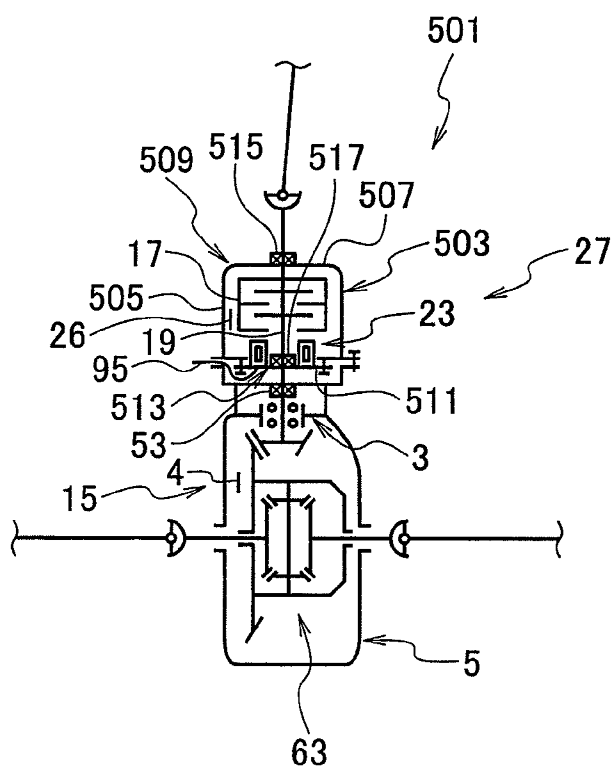
FIG. 6 is a schematic view of the power transmission device in accordance with a fifth embodiment of the present invention.

As shown in FIG. 6, the first casing member 509 has a cylindrical part 505 and the end wall 507. The intermittent mechanism 27 is accommodated in the cylindrical part 505 and fixed, on the side of the end wall 511, to the first casing 3. The second casing member 513 has the end wall 511 connected to the cylindrical part 505 integrally. The end wall 511 is also fixed to the first casing member 509. The actuator 23 is arranged on the side of the end wall 511, while the lead wire 95 of the actuator 23 is drawn from an interval between the end wall 511 and the first casing 3. Further, as mentioned above, the first sealing means (515, 517) are arranged between the outer rotating member 17 and the end wall 507 of the first casing member 509 and between the inner rotating member 19 and the end wall 511 of the second casing member 513, respectively. The sliding members in the intermittent mechanism 27 are lubricated by the second oil 26 in the second casing 503.

In the power transmission device 501 constructed above, the second casing 503 accommodating the intermittent mechanism 27 comprises the first casing member 509 and the second casing member 513 that includes the first sealing means 515, 517 to enclose the second oil 26 in the second casing 503. Therefore, there is no possibility that the second oil 26 leaks out of the second casing 503 even if assembling/disassembling the second casing 503 to and from the first casing 3 accommodating the power transmitting mechanism 15 together with the first oil 4.

Thus, it becomes possible to facilitate the assembling/disassembling operation of the intermittent mechanism 27 connected to the power transmitting mechanism 15 and also confirm the operations of the mechanism 27 in an actually-installed manner.

Additionally, with the arrangement where the actuator 23 is attached to the end wall 411, it is possible to facilitate the assembling operation of the actuator 23 and improve the degree of freedom in arranging the actuator 23.

6th. Embodiment

Figure 7:
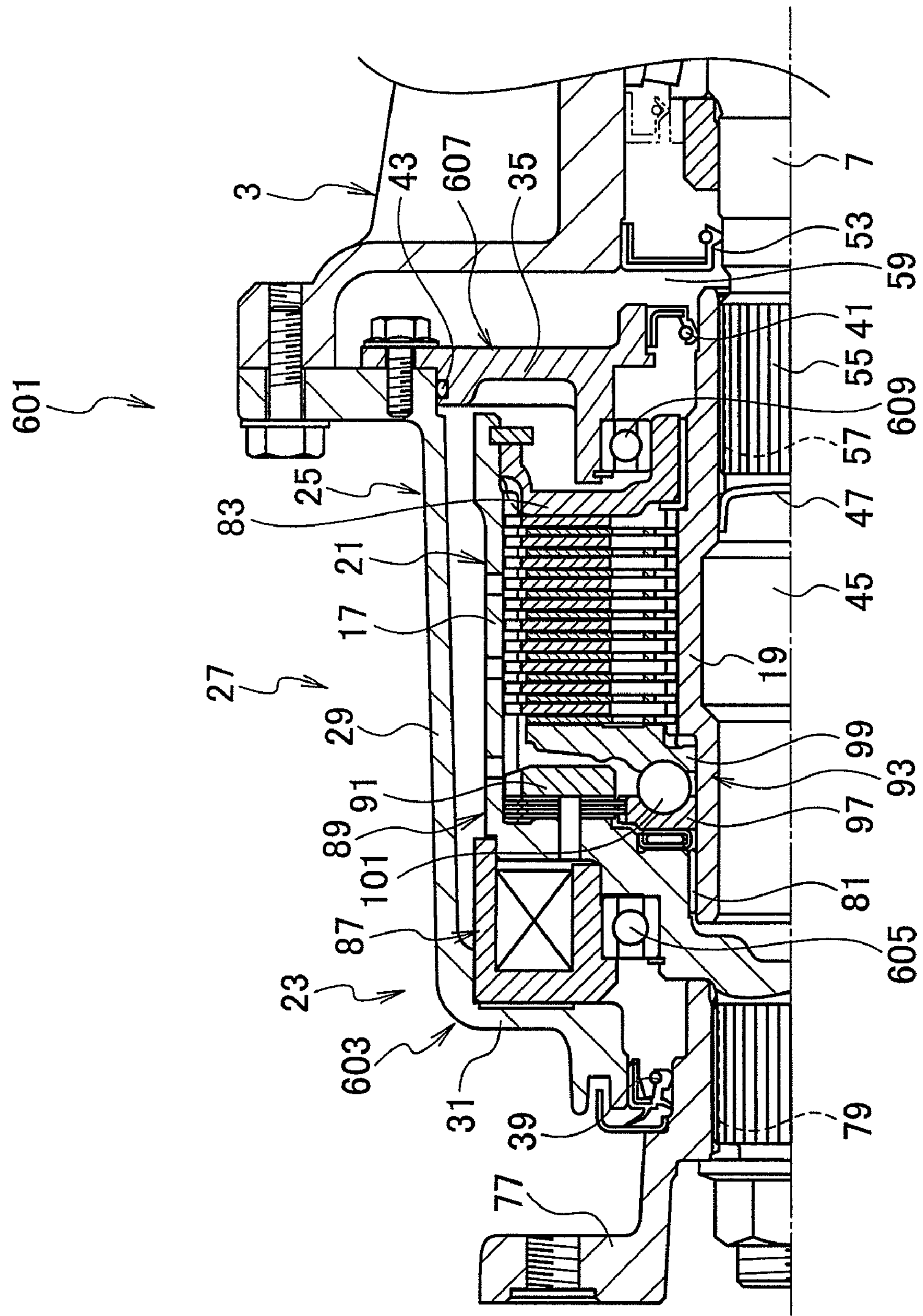
FIG. 7 is an enlarged sectional view of the substantial part of the power transmission device in accordance with a sixth embodiment of the present invention.

The sixth embodiment of the present invention will be described with reference to FIG. 7.

In a power transmission device 601 of this embodiment, a first casing member 603 supports the end 31 of the outer casing member 17 through a bearing 605, while a second casing member 607 supports the other end 35 of the outer casing member 17 through a bearing 609. Also, elements identical to those of the first embodiment will be indicated with the same reference numerals respectively and therefore, their overlapping descriptions are eliminated in view of the same effects.

In this way, since the outer rotating member 17 is supported, on both sides thereof, by the second casing 25 through the bearings 605, 609, the intermittent mechanism 27 can be supported stably.

In the power transmission device 601 constructed above, the second casing 25 accommodating the intermittent mechanism 27 comprises the first casing member 603 and the second casing member 607 that includes the first sealing means 39, 41, 43 to enclose the second oil 26 in the second casing 25. Therefore, there is no possibility that the second oil 26 leaks out of the second casing 25 even if assembling/disassembling the second casing 25 to and from the first casing 3 accommodating the power transmitting mechanism (not shown) together with the first oil 4.

Thus, it becomes possible to facilitate the assembling/disassembling operation of the intermittent mechanism 27 connected to the power transmitting mechanism and also confirm the operations of the mechanism 27 in an actually-installed manner.

Additionally, with the arrangement where the outer rotating member 17 is supported, on both sides thereof, by the second casing 25, the supporting form of the intermittent mechanism 27 is improved to stabilize the intermittent characteristics of the mechanism 27.

7th. Embodiment

The seventh embodiment of the present invention will be described with reference to FIG. 8.

In a power transmission device 801 of this embodiment, a second casing member 803 comprises a disc-shaped member 815 including an end wall 805 in the form of a plate and first sealing means 811, 813 secured to the end wall 805. The first sealing means 811, 813 comprise an outer circumferential part 807 fixed to the inner circumferential surface of the first casing member 33 and an inner circumferential part 809 sliding on either the rotating member 17 or the rotating member 30, respectively. Also, elements identical to those of the first and third embodiments will be indicated with the same reference numerals respectively and therefore, their overlapping descriptions are eliminated in view of the same effects.

Figure 8:
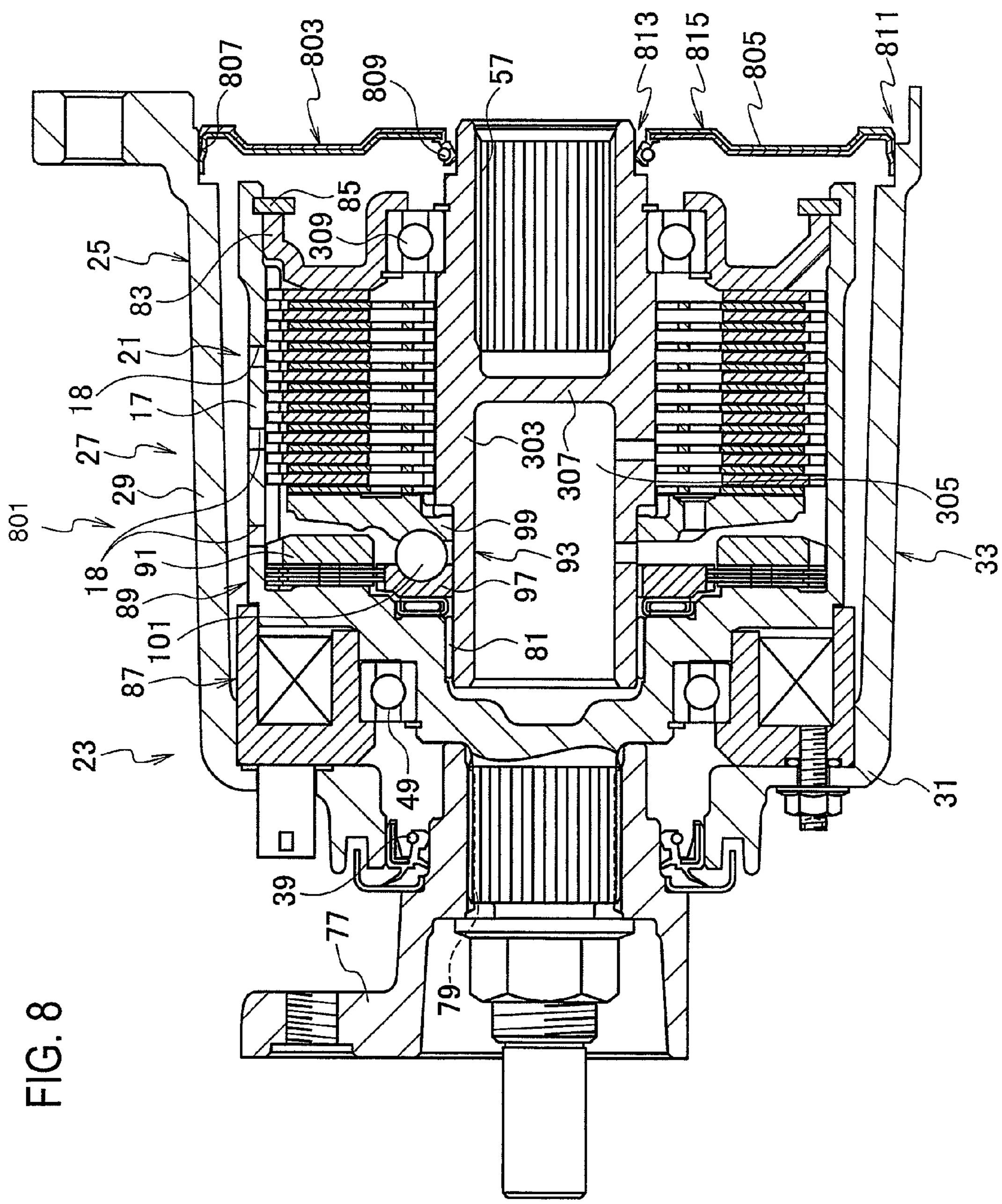
FIG. 8 is an enlarged sectional view of the substantial part of the power transmission device in accordance with a seventh embodiment of the present invention.

As shown in FIG. 8, the outer circumferential part 807 of the second casing member 803 is made from rubber material and formed on the end wall 805 securely. The outer circumferential part 807 is fixed to the inner circumferential surface of the first casing member 33, functioning as the first sealing means 811. While, the inner circumferential part 809 is also made from rubber material and formed on the end wall 805 securely. The inner circumferential part 805 is fixed to the outer circumferential surface of the inner rotating member 303, functioning as the first sealing means 813. The second casing member 803 is provided in the form of a disc-shaped member 815 composed of a plate and rubber material and press-fitted to the inner circumferential surface of the first casing member 33. In the modification, the first sealing means 811, 813 may be provided with radial, lattice-shaped or concentric ribs in view of improving the strength, although the sealing means 811, 813 are formed by the disc-shaped member 815 of a plate plus rubber material in this embodiment.

In the power transmission device 801 constructed above, the second casing 25 accommodating the intermittent mechanism 27 comprises the first casing member 33 and the second casing member 803 that includes the first sealing means 39, 811, 813 to enclose the second oil 26 in the second casing 25. Therefore, there is no possibility that the second oil 26 leaks out of the second casing 25 even if assembling/disassembling the second casing 25 to and from the first casing 3 accommodating the power transmitting mechanism (not shown) together with the first oil 4.

Thus, it becomes possible to facilitate the assembling/disassembling operation of the intermittent mechanism 27 connected to the power transmitting mechanism and also confirm the operations of the mechanism 27 in an actually-installed manner.

Further, since the second casing member 803 is formed by the disc-shaped member 815 having the first sealing means 811, 813, it is possible to improve the assembling capability and save the weight of the device 801.

In the inner rotating member 303, according to the embodiment, the spline hole 57 is provided, on the outer circumference, with the first sealing means 811, 813. It means that the first sealing means 811, 813 are arranged in the vicinity of the bearing 69 supporting the spline part 55 at the end of the shaft member 7 supported by the first casing 3. That is, it is possible to suppress the influence of the shaft member 7 in vibration on the first sealing means 811, 813, improving the durability of the device 801.

Again, as the disc-shaped member 815 is press-fitted, on the outer circumference, to the inner circumferential surface of the first casing member 33, it eliminated the need for fixing means, such as bolts, dispensing with an attachment space for the fixing means. As a result, it is possible to miniaturize the power transmission device 801 in comparison with the devices of the other embodiments.

Although the actuator 23 in common with the shown embodiments is constructed to utilize an electromagnet, it may be modified to the other type of actuator, for example, actuator using a hydraulic cylinder and a piston, actuator that utilizes an electric motor attached to the second casing eccentrically to the rotating axes of the inner and outer rotating members in pairs and a cam mechanism attached coaxially with the rotating axes of the rotating members, etc.

Additionally, the intermittent mechanism is not limited to only a multiplate frictional clutch and therefore, any mechanism could be employed if only formed to be intermissive of transmission torque.

Finally, it will be understood by those skilled in the art that the foregoing descriptions are nothing but embodiments and various modifications of the disclosed power transmission mechanism and therefore, various changes and modifications may be made within the scope of claims.

This application is based upon the Japanese Patent Application No. 2007-184544, filed on Jul. 13, 2007, the entire content of which is incorporated by reference herein.

What is claimed is:

1. A power transmission device for a vehicle, comprising:

a power transmitting mechanism having a first casing, a speed change mechanism having a speed change gear assembly supported in the first casing and provided on to at least one pair of power transmitting shafts and first oil accommodated in the first casing to lubricate the speed change mechanism; and an intermittent mechanism having a pair of rotating members, an intermittent part arranged between the rotating members to transmit and interrupt a driving force, an actuator for operating the intermittent part, a second casing accommodating the rotating members and the intermittent part and also connected to the first casing and second oil accommodated in the second casing to lubricate the intermittent part, wherein the second casing includes a first casing member having a cylindrical part and one end wall and a second casing member having another end wall connected to the cylindrical part integrally, the second casing further includes first sealing means arranged between one of the rotating members and the end wall, between the other of the rotating members and the other end wall and also between the first casing and the second casing to enclose the second oil in the second casing, wherein the power transmitting mechanism includes a shaft member supported by the first casing and having one end projecting from the first casing and connected to the either of the rotating members so as to allow an integral rotation therewith, the power transmitting mechanism further includes a second sealing means arranged between the first casing and the shaft member to enclose the first oil in the first casing, a segmentalized space is defined by the other end wall of the second casing member, the first sealing means, the first casing, the shaft member and the second sealing means to accommodate third oil.

2. The power transmission device of claim 1, wherein the pair of rotating members comprising an outer rotating member in the form of a cylinder and an inner rotating member in the form of a shaft rotatably arranged in the outer rotating member, the inner rotating member has a hollow part formed on a member's core side and provided with third sealing means for enclosing oil in the second casing.

3. The power transmission device of claim 2, wherein the first casing member supports the outer rotating member through a bearing, while the second casing member supports the inner rotating member through a bearing.

4. The power transmission device of claim 1, wherein the second casing member is connected, on an outer circumferential side thereof, to the first casing member integrally and adapted so as to fix the first sealing means arranged between the other of the rotating members and the other end wall, on the inner circumferential side of the second casing member.

5. The power transmission device of claim 1, wherein the shaft member has one end whose outer circumference is formed with a spline part which is engaged with a spline hole formed on a core side of the either of the rotating members, and the spline part is lubricated by a third oil secluded from the first oil and the second oil.

6. The power transmission device of claim 5, wherein the third oil is grease applied to the spline part, and the segmentalized space contains the grease and air in mixture.

7. The power transmission device of claim 1, further comprising an oil pump arranged on the other end wall of the second casing member to supply the second oil enclosed in the second casing to the intermittent mechanism forcibly.

8. The power transmission device of claim 1, wherein the second casing member is a disc-shaped member that comprises an outer circumferential part fixed to the inner circumferential surface to the first casing member and an inner circumferential part sliding on the either of the rotating members, wherein the outer and inner circumferential parts of the disc-shaped member serve the first sealing means.

* * * * *